United States Patent Office 3,574,635
Patented Apr. 13, 1971

3,574,635
BAKERY PRODUCT IMPROVING AGENT
AND METHOD
Bert W. Landfried, Independence, Mo., and John R.
Moneymaker, Overland Park, Kans., assignors to Top-
Scor Products, Inc., Kansas City, Kans.
No Drawing. Continuation of application Ser. No.
604,174, Dec. 23, 1966. This application Feb. 18,
1969, Ser. No. 805,945
Int. Cl. A21d 2/16
U.S. Cl. 99—91
9 Claims

ABSTRACT OF THE DISCLOSURE

The incorporation into a bakery dough of 12-hydroxy stearic alpha mono ester of glycerol improves tolerance against adverse effects of ingredient quality, formula and procedure variations. This agent also exhibits greater functionality than conventional emulsifiers in enhancing freshness retention, improving specific volume and body, and contributing to overall high quality in the resultant bakery product.

---

This is a continuation of application Ser. No. 604,174, filed Dec. 23, 1966 and now abandoned.

BACKGROUND OF THE INVENTION

Difficult problems encountered in the baking art, and particularly in the automated high rate production of yeast leavened baked goods, stem from variations in the quality of ingredients, especially the flour, used in dough formation. Such variations call for compensating changes in processing conditions and/or formulation, such as in moisture addition, fermentation time, and mixing time, to maintain product quality consistently at a high level. The optimum change or changes necessary to compensate for particular ingredient variations are normally not obvious, requiring costly and time consuming experimentation by highly skilled personnel. Thus, any means or method by which adverse effects of inappropriate procedures or ingredient variations may be minimized is highly desirable as an aid to efficient bakery production.

SUMMARY OF THE INVENTION

It has been discovered that the incorporation into the dough in amounts ranging from about 0.05% to 0.5% by weight based on flour of 12-hydroxy stearic alpha mono ester of glycerol provides an unexpected substantial increase in tolerance against adverse effects to bakery products otherwise produced by inappropriate procedures or ingredient variations. This agent has also been found to be more effective functionally than known bakery product improvers or emulsifiers in reducing apparent staling, improving specific volume and body and generally enhancing overall quality and, therefore, consumer appeal.

It is the principal objects of this invention: to provide such a tolerance increasing and quality improving agent; to provide a method of producing bakery products of consistently high quality; and to provide dough compositions which consistently result in high quality bakery products. Other objects and advantages of this invention will become apparent from the following description wherein is set forth by way of example certain preferred embodiments of this invention.

DESCRIPTION OF THE PREFERRED EMBODIMENTS

The additive which has been found to be effective in the practice of this invention may be described as the alpha ester of 12-hydroxy stearic acid and glycerol having the formula

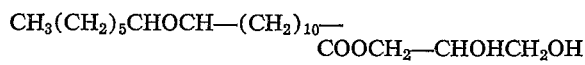

and the following typical structure:

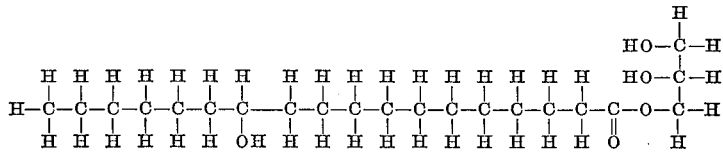

This compound, hereinafter usually referred to as "12-hydroxy monoglyceride," may be prepared in good yields by alcoholysis of fully hydrogenated purified castor oil with excess glycerol. Careful control of mole ratios, reaction time, temperatures, and catalyst make possible the preparation of mono and diglyceride reaction products containing 50 to 60 percent by weight of alpha monoglyceride while substantially avoiding the reaction of the acid group of one fatty acid molecule with the hydroxyl group from another to form so-called etholides or glycerol esters of etholides. For example, the following materials were heated under nitrogen for 60 minutes at 250° to 252° C. with constant vigorous stirring and collection of water of esterification:

Parts by wt.
Hydrogenated castor glycerides, Sap. No. 185 ----- 186
Glycerol previously reacted with .45 part reagent
  sodium hydroxide ------------------------------ 74

The reaction product was cooled to 200° C. and the sodium catalyst neutralized with a slight excess of phosphoric acid. Excess glycerol was allowed to separate and the lipid collected. The following reaction product resulted:

Melting range, ° C. ------------------------ 61–63
Acid number ------------------------------- 1.1
Saponification number --------------------- 146
Percent glycerol -------------------------- 8.9
Percent alpha monoglyceride --------------- 50.2
Total monoglyceride ----------------------- 52.3

When the theoretical saponification number was calculated based on the above analytical data, it was found to be in good agreement with the observed value. This finding negates the possibility of substantial etholide fatty acid in the product.

12-hydroxy monoglyceride is a hard, wax-like lipid at room temperature and care must be taken to introduce it into the bakery product dough so as to provide high surface exposure or the desired functionality will not be procured. Known methods of obtaining high surface exposure of a hard lipid in the baking art have included powdering, diluting in shortenings or other lipid solvents, plating on wheat flour or other farinaceous materials, and dispersing in water. The latter method is sometimes referred to as "hydration" and has produced excellent results in the practice of this invention.

12-hydroxy monoglyceride, while not particularly hydrophilic, can be water dispersed or hydrated by melting and slowly adding water with constant stirring until a smooth O/W emulsion is obtained with the 12-hydroxy monoglyceride fraction being in the dispersed phase and the water being in the continuous phase. An homogenizer or other emulsion stabilization tool is normally required to implement uniform dispersion. Satisfactory plastic water dispersions result with approximately 25% to 50% lipid.

Although improvement in baked products have been described as related to the use of alpha fatty acid esters of glycerol (monoglycerides), no significant increase in tolerance to ingredient quality variations and inappropriate processing conditions has been associated with their usage. In the practice of this invention, however, the resultant bakery products, surprisingly, show the improvement supplied by conventional monoglycerides as well as a significant increase in tolerance to ingredient quality variations and inappropriate processing conditions. Further, 12-hydroxy monoglyceride produces the desired improvement at lower levels than conventional monoglycerides as illustrated by the following examples.

EXAMPLE I

Improving characteristics

Commercial 12-hydroxy stearic triglyceride (castor oil) having a fatty acid composition of 1.5% palmitic acid, 13% stearic acid and 85.5% 12-hydroxy stearic acid was used as a basis in the preparation of two mono and diglyceride reaction products. One of the reaction products contained 41.0% alpha ester; the second 58.4% alpha ester. A third product was prepared using high vacuum molecular distillation and contained 85.3% alpha 12-hydroxy stearic monoglyceride. These reaction products were characterized as follows:

|  | Percent alpha mono-glyceride | Percent free glycerol | Acid No. | Sap. No. | Iodine value | M.P. (° C.) |
|---|---|---|---|---|---|---|
| Preparation No. 1 | 41.0 | 8.5 | 3.4 | 156 | 2.6 | 62.5–63.5 |
| Preparation No. 2 | 58.4 | 0.27 | 3.1 | 164 | 3.3 | 65.0–68.0 |
| Preparation No. 3 | 85.3 | 3.6 | 3.6 | 155 | 3.0 | 70.5–73.0 |

Hydrates were produced from the three preparations. For comparison a fourth hydrate was produced containing distilled glycerol monostearate (Myverol 1800, Distillation Products Industries, Rochester, N.Y.; 91.3% alpha stearic monoglyceride). The resultant four preparations were essentially equal in physical characteristics at room temperature after 24 hours. All were smooth, white emulsions of the O/W type. The four preparations were included in a standard commercial white bread formula at levels adjusted to introduce 0.2% alpha ester based on the formula flour. A conventional sponge dough preparation method was employed and the preparations were introduced with the dough ingredients. The bread formula follows:

| | Parts by wt. |
|---|---|
| Patent flour (14% moisture basis) | 700.00 |
| Bakers yeast | 17.50 |
| Sucrose | 56.00 |
| High heat non-fat milk solids | 28.00 |
| Shortening | 14.00 |
| Salt | 14.00 |
| Arkady yeast food | 3.50 |
| Water | 486.50 |

Each test was performed in quadruplicate, and control doughs containing no monoglyceride were included for comparison. Following baking in one-pound units, the loaves were allowed to cool under controlled conditions; then stored in polyethylene bags for forty-eight hours. At the end of this period test loaves were cut and subjected to a standard measurement for crumb compressibility using a Universal Penetrometer. Values given in Table I represent an average of thirty-six measurements.

After completion of the compressibility evaluation, the test bread was scored subjectively using a system which separately takes into account the major internal and external characteristics of the loaves. These characteristics include loaf volume, crust color, crust character, break and shred, grain, texture, crumb color, aroma, taste and eating quality. In this scoring system each factor is considered separately and penalized according to the degree of deviation from a hypothetical perfect loaf which would score 100. An acceptable commercial loaf will receive a score of 80 or higher with a score of 84 or greater considered excellent. This system is based essentially on that promulgated by the American Institute of Baking and is comparable to the various methods in use throughout the baking and milling industries. The results were as follows:

TABLE I

| Hydrated preparations [1] | Average 1-lb. loaf volume, cc. | Average compressibility, 0.1 mm. | Average quality score |
|---|---|---|---|
| Prep. No. 1 (hydroxy monoglyceride) | 2,760 | 191 | 84 |
| Prep. No. 2 (hydroxy monoglyceride) | 2,950 | 204 | 86 |
| Prep. No. 3 (hydroxy monoglyceride) | 2,875 | 194 | 85 |
| Prep. No. 4 (stearic monoglyceride) | 2,785 | 189 | 84 |
| Control (no additive) | 2,750 | 161 | 82 |

[1] Adding 0.2% alpha monoglyceride based on formula flour.

These results showed 12-hydroxy monoglyceride effectively improves loaf volume, crumb compressibility and quality score. Greater improvement was associated with the higher purity of alpha ester showing this material to be the preferred additive agent. Distilled 12-hydroxy monoglyceride (Prep. No. 3) was found to be significantly superior to distilled glycerol monostearate (Prep. No. 4) as an improving agent.

EXAMPLE II

Further tests showing improving characteristics

The enhanced improving action of 12-hydroxy monoglyceride over that associated with the use of glycerol mono fatty acid esters was further shown by the following comparisons. A typical monoglyceride derived from fully hydrogenated tallow and containing 61.7% alpha ester was hydrated at 25% in water to form a plastic, O/W emulsion suitable for dispersion in bread dough. A monoglyceride reaction product derived from fully hydrogenated castor oil and containing 53.3% alpha ester was processed to a similar emulsion. These preparations were essentially equal in physical characteristics prior to usage. The bread preparation and evaluation method described in Example I were used. Results follow:

TABLE II

| Percent alpha monoglyceride added based on formula flour | Average 1-lb. loaf volume, cc. | Average compressibility, 0.1 mm. | Average quality score |
|---|---|---|---|
| Control (no additive) | 2,700 | 168 | 82.0 |
| 0.05 stearic monoglyceride | 2,750 | 170 | 82.5 |
| 0.05 hydroxy monoglyceride | 2,875 | 182 | 84.0 |
| 0.10 stearic monoglyceride | 2,825 | 191 | 84.0 |
| 0.10 hydroxy monoglyceride | 3,000 | 188 | 85.0 |
| 0.20 stearic monoglyceride | 2,800 | 194 | 83.0 |
| 0.20 hydroxy monoglyceride | 2,950 | 204 | 86.0 |

The data clearly demonstrated the superior improving action of 12-hydroxy monoglyceride. Comparison with stearic monoglyceride showed the actions of the two lipids to be quite different. 12-hydroxy monoglyceride usage at 0.05% produced significant improvement in all areas of evaluation, with higher levels showing even greater improving effects. Stearic monoglyceride showed little effect at 0.05% usage on quality or volume and no significant effect on apparent staling.

EXAMPLE III

Absorption tolerance

Using the hydrated preparations of Example II and the bread production formula and methods of Example I, the comparative effect of 12-hydroxy monoglyceride and stearic monoglyceride on bread dough tolerance to variable free water introduction was demonstrated. A series of tests were made using 64, 67, and 70 parts water for each 100 parts of flour, and 0.10% alpha ester of each type. Controls containing no additive were also prepared. The average results follow:

TABLE III

| Absorption [1] | Additive agent | Average one-pound loaf volume, cc. | Average quality score |
|---|---|---|---|
| 64 | Hydroxy monoglyceride | 2,900 | 83.5 |
| 67 | do | 2,900 | 84.5 |
| 70 | do | 2,950 | 85.0 |
| 64 | Stearic monoglyceride | 2,850 | 83.0 |
| 67 | do | 2,900 | 84.0 |
| 70 | do | 2,750 | 83.0 |
| 64 | None | 2,900 | 83.0 |
| 67 | do | 2,885 | 82.0 |
| 70 | do | 2,700 | 81.5 |

[1] Percent based on flour weight.

This data clearly indicated an improved tolerance of the bread dough to increased free moisture introduction when 12-hydroxy monoglyceride was introduced into the system. When 64 parts of water were used with each 100 parts of flour, the doughs containing no additive were at optimum. As water was increased, degradation became apparent. Dough containing 12-hydroxy monoglyceride produced bread of exceptional volume and quality at the absorption level of 70%, which was excessive even for dough containing the conventional additive.

EXAMPLE IV

Mixing tolerance

The preparations of Example II and bread production formula (with the noted exception) and methods of Example I were used to determine the characteristics of 12-hydroxy monoglyceride under variable mixing conditions. In this test the formula bakers yeast was reduced to 14.0 parts. Comparative doughs were mixed 4 and a normal 7 minutes. Results follow.

TABLE IV

| 0.1% alpha ester added based on formula flour | Dough mix time, minutes | Average 1-lb. loaf volume, cc. | Average quality score |
|---|---|---|---|
| None | 4 | 2,700 | 81.0 |
| Do | 7 | 2,825 | 83.0 |
| Hydroxy monoglyceride | 4 | 2,825 | 84.0 |
| Do | 7 | 2,850 | 85.5 |
| Stearic monoglyceride | 4 | 2,775 | 83.0 |
| Do | 7 | 2,775 | 84.0 |

Results demonstrated that the introduction of 0.1% 12-hydroxy monoglyceride facilitated the preparation of improved quality bread under conditions of less than usual optimum mixing. The improvements associated with the incorporation of the hydroxy ester were significantly greater than those found with the conventional additive at the same usage level.

EXAMPLE V

Fermentation tolerance

A mono and diglyceride reaction product synthesized from commercial 12-hydroxy stearic triglyceride and containing 54.5% alpha ester was "hydrated" as previously described. A similarly prepared hydrate of distilled glycerol monostearate (Myverol 1800) was used for comparative purposes. The white bread formula and procedure of Example IV were again employed. In this test the fermentation time of the standard sponge (containing 65% of the total flour) was varied. Sponges were allowed to ferment under controlled temperature and humidity conditions for three, four and five hours prior to dough make-up. The additives were introduced with the dough ingredients. Bread was cut and scored following storage for 24 hours. Results are tabulated below.

TABLE V

| 0.1% alpha ester added based on formula flour | Sponge fermentation time, hours | Average 1-lb. loaf volume, cc. | Average quality score |
|---|---|---|---|
| Hydroxy monoglyceride | 3 | 2,760 | 83.5 |
| Do | 4 | 2,825 | 85.0 |
| Do | 5 | 2,875 | 86.0 |
| Stearic monoglyceride | 3 | 2,710 | 82.0 |
| Do | 4 | 2,825 | 83.5 |
| Do | 5 | 2,800 | 85.0 |
| None | 3 | 2,725 | 79.0 |
| Do | 4 | 2,740 | 81.0 |
| Do | 5 | 2,825 | 83.0 |

The superior action of 12-hydroxy monoglyceride as an aid in the preparation of high quality pan bread was clearly shown. Although loaf quality and volume generally improved with increased fermentation time, those samples containing 12-hydroxy monoglyceride consistently produced the best bread.

EXAMPLE VI

Shortening inclusion tolerance

The ability of hydroxy monoglyceride to aid in the preparation of superior quality baked products was again demonstrated by varying the shortening addition to the standard white bread formula. The "hydrate" preparation and experimental method used were identical to those in Example IV. Comparative doughs were prepared containing 0, 2, and 4 parts lard for each 100 parts of formula flour. The averaged results are recorded below.

TABLE VI

| Hydroxy monoglyceride added based on formula flour | Dough lard percent [1] | Average loaf volume, cc. | Average quality score |
|---|---|---|---|
| None (control) | None | 2,675 | 77 |
| 0.05% | None | 2,760 | 81 |
| 0.10% | None | 2,750 | 82 |
| None (control) | 2 | 2,650 | 80 |
| 0.05% | 2 | 2,790 | 84 |
| 0.10% | 2 | 2,850 | 85 |
| None (control) | 4 | 2,725 | 81 |
| 0.05% | 4 | 2,825 | 85 |
| 0.10% | 4 | 2,800 | 84 |

[1] Based on flour.

Consistent improvement in loaf volume and total quality was demonstrated with the incorporation of 0.05% and 0.10% 12-hydroxy monoglyceride in white pan bread when lard was varied from none to 4% based on formula flour. The quality scores indicate that this additive altered bread quality from commercially unacceptable to acceptable in the absence of shortening. When lard was incorporated in the usual range of usage, quality was improved from the average range (80–81) to the excellent range (84–85).

EXAMPLE VII

Effects on cooked flour paste viscosity

This test was performed to illustrate in a more direct manner that 12-hydroxy monoglyceride has a significant functionality in the baking process and a functionality that is quite different from that of a conventional monoglyceride.

It is generally accepted that known monoglyceride bread softening agents retard the gelatinization of starch. This characteristic will result in an initial reduced viscosity of a flour slurry which is heated in a controlled fashion, but produces little change in peak viscosity.

Slurries were prepared in accordance with the following formulation and allowed to stand three hours at room temperature in a covered glass beaker prior to transfer into a standard bowl of a C. W. Brabender Instrument Co. Amylograph. This instrument is a recording viscometer equipped with a thermoregulator allowing an automatic increase in temperature of 1.5° C. per minute. Using this equipment, the temperature of the continuously mixed slurry was increased from 30°C. to 90° C. in 40 minutes, then held at 90° C. for an additional 30 minutes simulating internal dough condition during a conventional moderately high temperature short baking time procedure. Viscosity was recorded continually.

Formulation:                                   Gms.
   Distilled water _____ 450
   Unmalted wheat flour _____ 55
   Reagent NaCl _____ 10
   Refined cotton seed oil _____ 1

The "hydrates" described in Example II were introduced and dispersed at levels calculated to result in the addition of 0.2% alpha ester based on the weight of the flour. The test results follow.

TABLE VII

| Additive | Brabender unit viscosity[1] | B.U. viscosity after 10 min.[1] | Peak viscosity, B.U. | Peak time, minutes[1] |
|---|---|---|---|---|
| None (control) | 560 | 800 | 830 | 23.5 |
| Hydroxy monoglyceride | 310 | 600 | 1,310 | 29.0 |
| Stearic monoglyceride | 380 | 720 | 860 | 22.5 |

[1] At 90° C.

The introduction of 12-hydroxy monoglyceride produced a considerable initial reduction in flour paste viscosity at 90° C. A comparatively reduced viscosity continued for a significant time and then a greatly increased peak viscosity was achieved with increased time required to achieve the peak. This data demonstrated a pronounced difference in the mode of function associated with 12-hydroxy monoglyceride.

The increased viscosity potential of wheat flour paste associated with the introduction of 12-hydroxy monoglyceride is believed to be responsible for at least part of the demonstrated improvements in baked products, particularly pan bread where unusually good body and side wall strength are concurrent with improved interior softness and retarded apparent staling.

EXAMPLE VIII

Functionality in sweet dough

A conventional sponge dough procedure was used for the preparation of representative sweet dough formulas detailed below. 12-hydroxy monoglyceride in "hydrate" form was added with dough ingredients.

Formula No. 1

Sponge ingredients:                         Parts by wt.
   Patent flour _____ 420.0
   Arkady yeast food _____ 3.5
   Bakers yeast _____ 28.0
   Water _____ 270.0
Dough ingredients:
   Patent flour _____ 175.0
   Cake flour _____ 105.0
   Granulated sucrose _____ 126.0
   Non-fat dry milk solids _____ 28.0
   Vegetable shortening _____ 70.0
   Salt _____ 14.0
   Egg yolk solids _____ 14.0
   Bakers yeast _____ 28.0
   Water _____ 173.0

Formula No. 2

Same as Formula No. 1 with the reduction of vegetable shortening to 42 parts by weight.

Tests were performed in duplicate, and control doughs containing no 12-hydroxy monoglyceride were processed for comparison. Following baking in one-pound units, the loaves were allowed to cool, then stored in air tight polyethylene bags for twenty hours prior to scoring. The subjective scoring procedure outlined in Example I was utilized. A summary of results follows.

TABLE VIII

| Shortening formula, parts: | Hydroxy monoglyceride added[1] | Average total quality score |
|---|---|---|
| 70 | [2] None | 82 |
| 70 | 0.05 | 82 |
| 70 | 0.10 | 83.5 |
| 70 | 0.20 | 84 |
| 70 | 0.40 | 84.5 |
| 42 | [2] None | 83.5 |
| 42 | 0.05 | 83.5 |
| 42 | 0.10 | 84 |
| 42 | 0.20 | 84.5 |
| 42 | 0.40 | 85 |

[1] Based on formula flour. [2] Control.

The data showed the level of 12-hydroxy monoglyceride necessary to accomplish the desired improving effects in sweet dough to be greater than that necessary in white pan bread (Example II). The loaves in both sweet dough series were observed to increase in softness with increasing levels of hydroxy monoglyceride addition with the softest being that containing 0.4% of the additive in each case. The improvements reflected in total average quality score, however, are not limited to softness. All samples containing 0.1% or more of the additive exhibited improved internal characteristics, such as finer grain, smoother texture and superior body compared to controls.

Although this invention has been described with particular reference to certain typical embodiments thereof, it is to be understood that variations and modifications can be effected without departing from the scope thereof and it is not to be limited except insofar as defined in the following claims.

What we claim and desire to secure by Letters Patent is:

1. In the production of bakery dough wherein variations in ingredients and/or make-up procedures beyond certain limits normally result in commercially unacceptable baked products, the method for increasing the tolerance of the bakery dough so that variations beyond said limits will not prevent the production of commercially acceptable baked products comprising the incorporation into the dough prior to baking of 12-hydroxy stearic alpha mono ester of glycerol in a manner producing high surface exposure, said mono ester being included in the dough in an amount ranging from 0.05% to 0.5% by weight based on the flour in the dough.

2. A bakery dough composition for producing commercially acceptable baked products, although the dough ingredients and/or make-up procedures vary beyond limits for normaly producing commercially acceptable baked products comprising a high surface exposure mixture of flour and 12-hydroxy stearic alpha mono ester of glycerol in an amount ranging from 0.05% to 0.5% by weight based on said flour.

3. A composition of matter for incorporation into bakery dough to render said dough capable of producing commercially acceptable baked products, although the dough ingredients and/or make-up procedures vary beyond limits for normally producing commercially acceptable baked products comprising a dispersion of 12-hydroxy stearic alpha mono ester of glycerol in water, said water being in the continuous phase, said composition of matter being incorporated in the dough in a proportion wherein said mono ester is added in an amount ranging from 0.05% to 0.5% by weight based on flour in the dough.

4. The dough composition as set forth in claim 2 wherein said composition is devoid of shortening.

5. A bakery product produced by baking the dough composition set forth in claim 2.

6. The method of producing commercially acceptable bakery products comprising:
   (a) mixing a bakery dough of commercially unacceptable quality due to excessive moisture inclusion, low mixing time, low shortening inclusion, or low fermentation time, and
   (b) incorporating into said dough prior to baking 12-hydroxy stearic alpha mono ester of glycerol in an amount sufficient to produce commercially acceptable quality in the baked product.

7. The method of claim 6 wherein:
   (a) said 12-hydroxy stearic alpha mono ester of glycerol is incorporated in a manner producing high surface exposure and is included in the dough in an amount ranging from 0.05% to 0.5% by weight based on flour in the dough.

8. A commercially acceptable bakery dough composition comprising a mixture of:
   (a) a bakery dough normally inadequate to produce a commercially acceptable baked product due to excessive moisture inclusion, low mixing time, low shortening inclusion, or low fermentation time, and
   (b) 12-hydroxy stearic alpha mono ester of glycerol in an amount sufficient to produce commercially acceptable quality in the baked product.

9. The mixture as set forth in claim 8 wherein:
   (a) said 12-hydroxy stearic alpha mono ester of glycerol is incorporated in a manner producing high surface exposure and is included in the dough in an amount ranging from 0.05% to 0.5% by weight based on flour in the dough.

References Cited
UNITED STATES PATENTS

| 2,921,883 | 1/1960 | Reese et al. | 106—171X |
| 3,111,409 | 11/1963 | Jackson et al. | 99—91 |

OTHER REFERENCES

A. R. Daniel, "Bakery Materials and Methods," 4th edition, Maclaren and Sons, Ltd., London, 1963, p. 223, TX763D3b.

A. LOUIS MONACELL, Primary Examiner

J. R. HOFFMAN, Assistant Examiner

U.S. Cl. X.R.

99—92